United States Patent [19]
Wehrell

[11] Patent Number: 6,158,389
[45] Date of Patent: Dec. 12, 2000

[54] SPRINT TRAINING EXERCISE SYSTEM AND METHOD

[76] Inventor: Michael A. Wehrell, 60 Roberts Rd., #22, Los Gatos, Calif. 95032

[21] Appl. No.: 09/180,685
[22] PCT Filed: May 14, 1997
[86] PCT No.: PCT/US97/08224
  § 371 Date: Nov. 13, 1998
  § 102(e) Date: Nov. 13, 1998
[87] PCT Pub. No.: WO97/42809
  PCT Pub. Date: Nov. 20, 1997

Related U.S. Application Data
[60] Provisional application No. 60/017,664, May 14, 1996.
[51] Int. Cl.[7] .............................. A01K 15/02; A01K 1/06
[52] U.S. Cl. ............................................. 119/704; 119/784
[58] Field of Search .................................... 119/701, 703, 119/74, 780, 784, 785, 839; 185/3; 104/106

[56] References Cited

U.S. PATENT DOCUMENTS

| 1,563,212 | 11/1925 | Madiar | 119/784 |
|---|---|---|---|
| 2,500,805 | 3/1950 | Costello | 119/784 |
| 2,507,994 | 5/1950 | Pierce | 104/106 |
| 4,138,966 | 2/1979 | Hesnault | 119/701 |
| 4,619,222 | 10/1986 | Sundberg et al. | 119/704 |
| 5,339,773 | 8/1994 | Van Druff | 119/785 |
| 5,497,732 | 3/1996 | Moffre et al. | 119/784 |
| 5,630,380 | 5/1997 | Karanges | 119/704 |

Primary Examiner—Peter M. Poon
Assistant Examiner—Elizabeth Shaw
Attorney, Agent, or Firm—Rogers & Killeen

[57] ABSTRACT

This invention is a sprint exercise training system and method suitable for a variety of animals, including horses, dogs and humans, to apply a restraining force during training to condition an animal to run faster. An exercise path (19) is defined by a single elevated monorail (20). The monorail (20) slidably carries a restraining assembly for providing a force opposing, and generally aligned opposite, an animal's direction of movement along an exercise path. A harness (12, 16) transfers the restraining force via a single tether (5) from the restraining assembly to the moving animal. An animal using the present invention may be conditioned to run faster when not subjected to a restraining force.

22 Claims, 16 Drawing Sheets

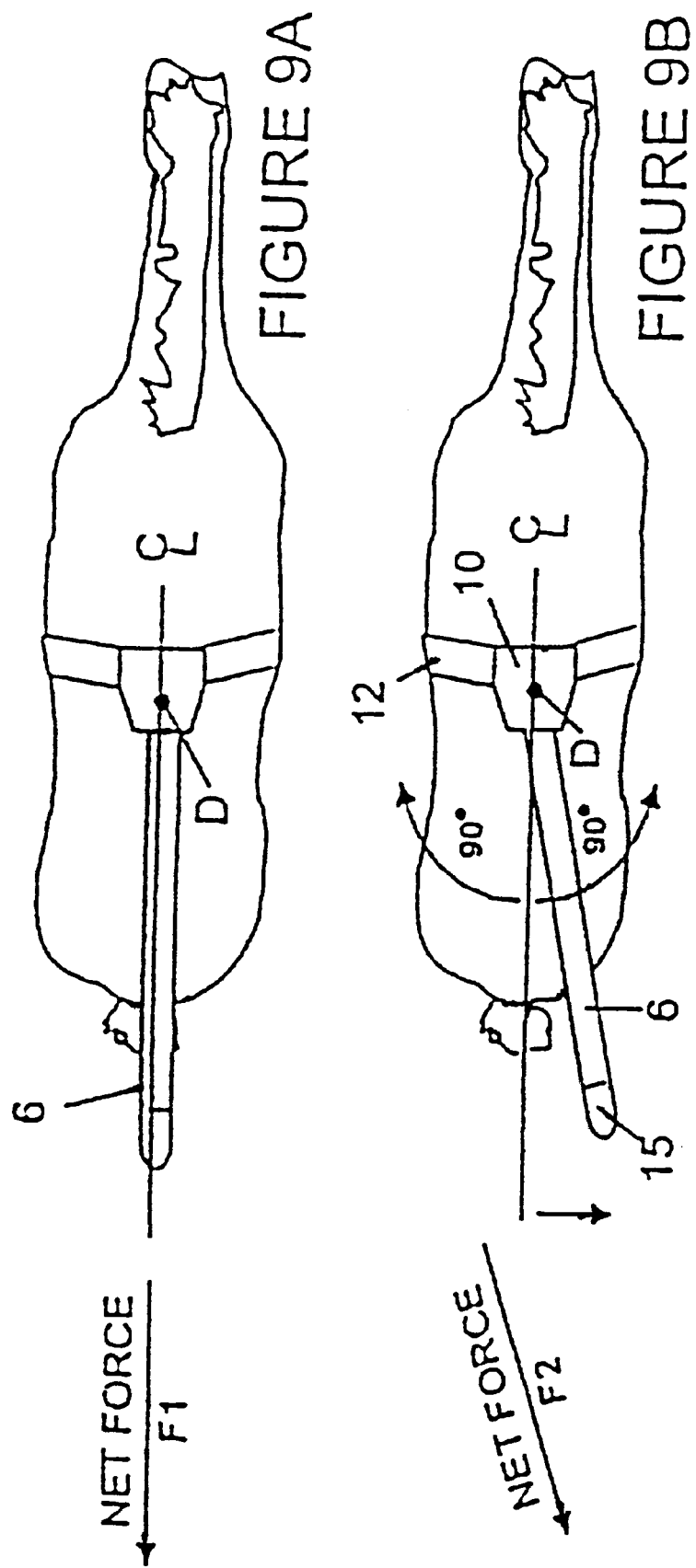

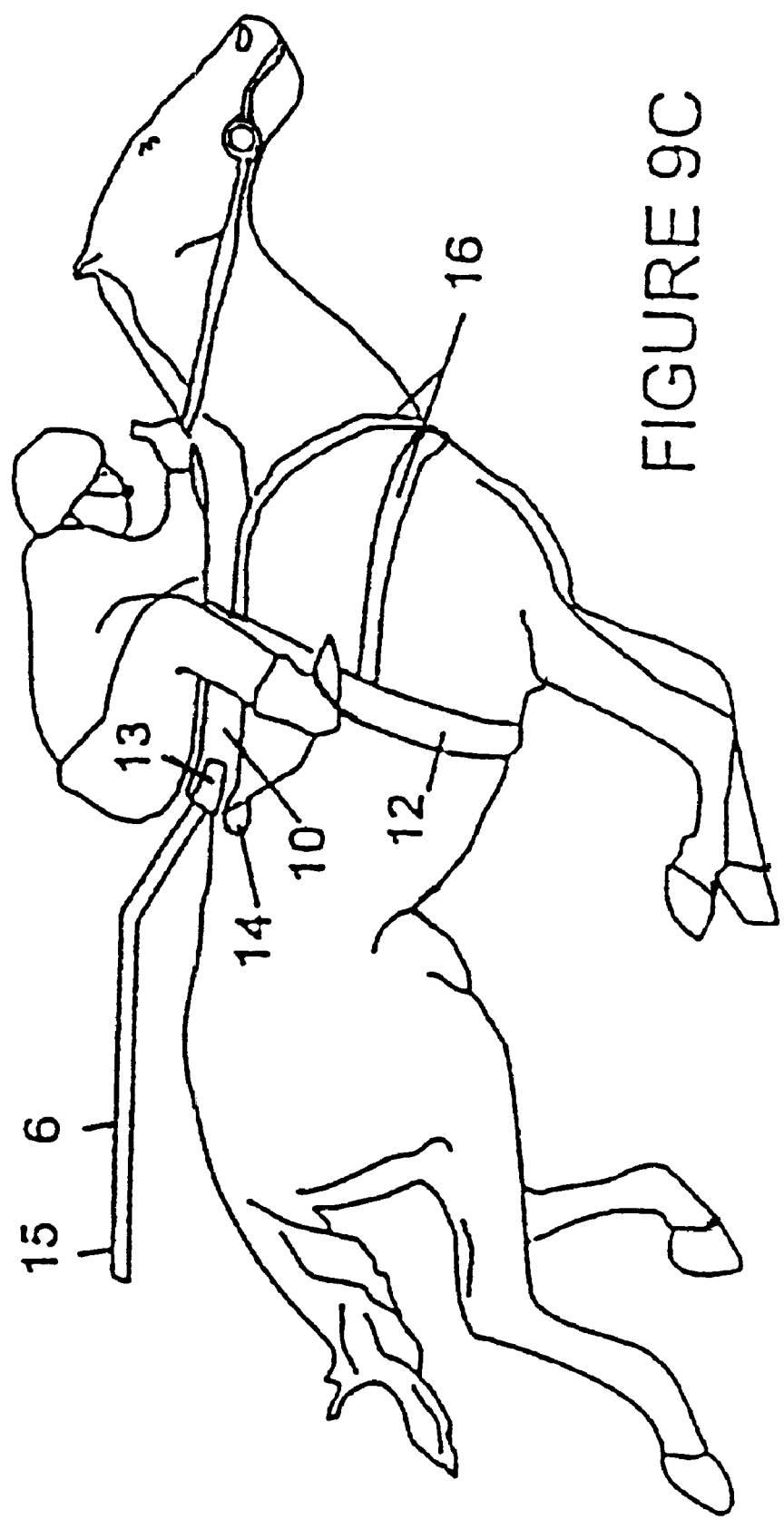

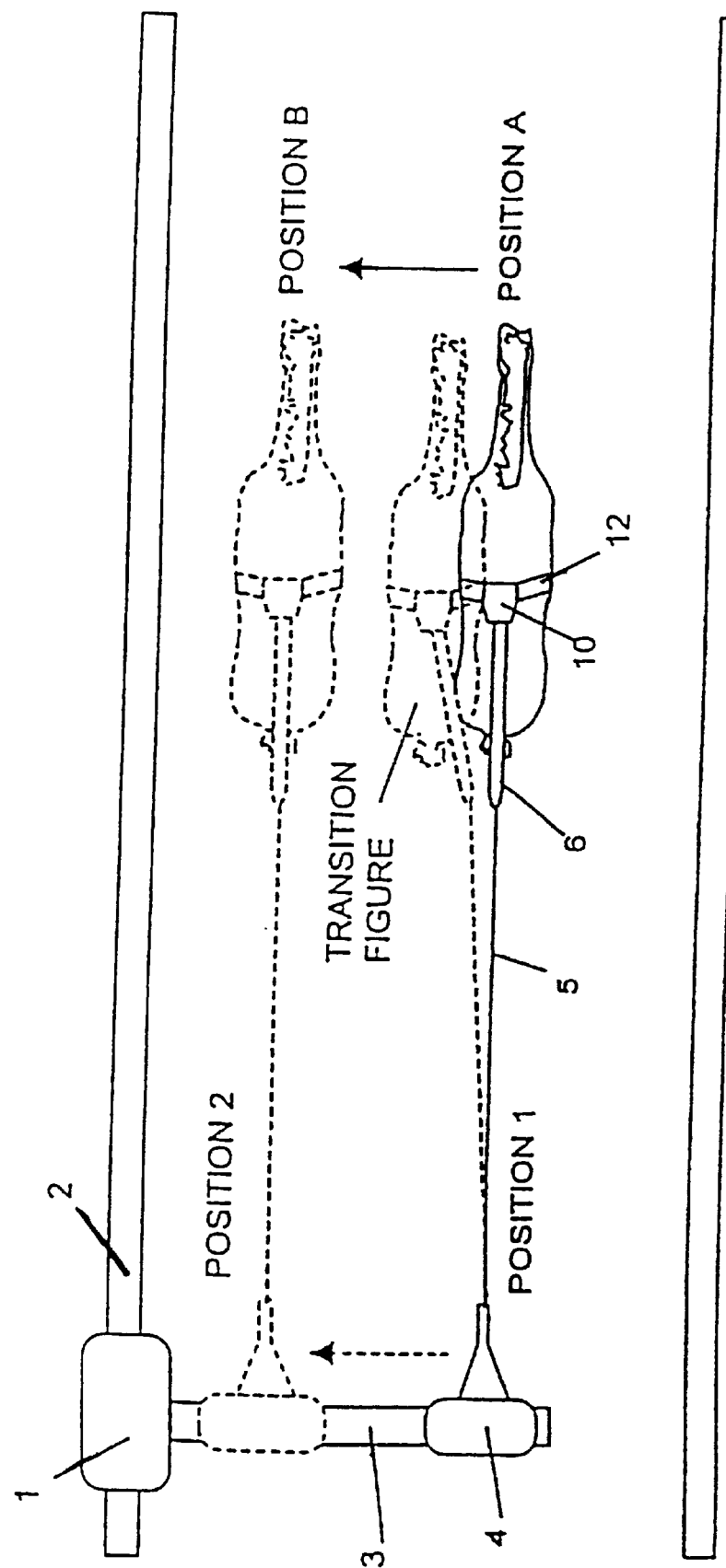

SPRINT TRAINING EXERCISE SYSTEM AND METHOD

This application claims benefit to U.S. Provisional Application No. 60/017,664 filed May 14, 1996.

The present invention relates to an exercise system and method for training animals to increase their running speed. More particularly, it relates to an exercise system and method wherein a restraining force is applied to a running animal to condition the animal to be able to run at higher speeds when no force is applied.

As used herein, the term "animal" refers to any animal amenable to training to increase running speed and includes, without limitation, horses, dogs and humans.

When an animal's body is repeatedly subjected to strenuous physical activity which may tax both the musculatory and cardiovascular system, the body adapts and becomes conditioned so that it can more efficiently perform the physical activity to which the body has been repeatedly subjected. Examples include sprinters who select training activities which develop great leg strength and muscle mass in order to quickly accelerate their whole body to high speeds, and marathon runners who select other training activities to develop legs with leaner muscles in order to more efficiently carry the marathon runner long distances.

In order to condition a animal's body to perform at a level beyond its current capability, the animal may engage in selected strenuous activity that exceeds its current level of conditioning. For example, a marathoner who wishes to improve his time may run longer distances in training than actually run in competition. The body thereby will cardiovascularly adapt to accommodate the marathoner for a longer distance. The marathoner may then run a shorter distance faster than before the body underwent the cardiovascular adaptation.

This conditioning method, however, does not adapt sprinting animals who sprint at full speed over short distances. Conditioning methods currently know in the art are not optimally effective in conditioning sprinters and exhibit various disadvantages. Some of these prior art methods and disadvantages are discussed in U.S. Pat. No. 5,070,816 to Wehrell (the "Wehrell Patent"). While the Wehrell Patent discloses an exercise system and method resolving many of the problems of the prior art, there continues to exist a need for improved methods which repeatedly subject sprinting animals to an appropriate strenuous physical activity so that the body adapts and becomes conditioned so that it can more efficiently perform the sprinting function.

A prior art system (the "Wehrell System") for conditioning animals is shown in FIG. 1. In this system, restraining devices 41 and 42 are supported by guide rails 8 and 9. Tethers 43 and 44 are attached to each of restraining devices 41 and 42 respectively and to pivoting member 47. Pivoting member 47 is attached through electronic position sensor 46 to rigid harness 45. This system permits the application of a training force in direction A upon an animal, a horse in these figures, running around a training track.

This system additionally allows the horse to shift across the track laterally without an imbalanced force acting from the left or right side. If the horse shifts laterally towards guide rail 9 while running, the vectors of tethers 43 and 44 change relative to electronic position sensor 46 on harness 45. When restraining devices 41 and 42 apply equal resistance, i.e., Force A=Force B, the difference in the tether angles will create a unequal Force A' which is greater than Force B'. Such lateral force relative to the horse's direction of motion is undesired. For example, when tether 43 creates a Force A'>Force B', pivoting member 47 rotates clockwise in favor of the greater Force A'. Sensor 46 detects this rotation and sends a electronic signal instructing restraining device 41 to apply less resistance to tether 43 while simultaneously instructing restraining device 42 to apply more resistance to tether 44, such that the net training resistance stays the same.

Under ideal operation, the simultaneous adjustment operate so that the horse feels equal forces, i.e., Force C=Force D, pulling directly backwards at points 410 and 411 of the rigid harness 45 attaching to the saddle strap (the "Wehrell Harness"). If Force C Force D, there is no net moment of torque about point C in either the clockwise or counter clockwise direction of motion. In practice, this simultaneous equalization of forces is difficult to achieve and the application of unequal forces to attachment points 410 and 411 may result. Undesirably, the simultaneous control of two restraining devices 41 and 42 requires a complex and highly coordinated control system.

FIGS. 2, 3, and 4 variously model the Wehrell Harness under three operating conditions, the numbering corresponding to harness components of FIG. 1. FIG. 2 illustrates member 47 aligned with harness 45 under the condition of tethers 43 and 44 pulling equally from both directions. The Wehrell System provides that if tether 43 pulls harder than tether 44, member 47 will rotate clockwise as indicated in FIG. 1, and illustrated by FIG. 3. Such a displacement between members 47 and 45 physically requires the application of a counter-clockwise torque to harness 45 at axis point C. FIG. 4 models the resulting harness movement under the condition of tether 43 pulling harder than tether 44 while zero torque is applied to harness 45 at axis point C. For example, if a 4 pound net force was applied to pivoting member 47 in the direction of Force A' (see FIG. 1), and member 5 is 8 feet long, 32 foot-lbs. of clockwise torque results and is thus applied to the horse through points 410 and 411. For the harness to operate as illustrated in FIG. 3, 32 foot-lbs of counter clockwise torque would be required to stabilize harness 45 prior to allow member 47 to rotate as shown. This is not desired. The present invention obviates the requirement for the application of such counter clockwise torque.

Further, in the system has described above, the physical relationship between members 45, 46 and 47 affect the system operation. If the horse strikes harness 45 or if harness 45 strikes guide rails 8 or 9, then position sensor 46 reacts by rapidly moving left or right. Such rapid movement may cause pivoting member 47 to react and pivot, causing the generation of false error signals to restraining devices 41 and 42. This may cause the system to become unstable and present a danger to the horse being trained.

Another disadvantage of such a system is that a rider may not attach the tethers to the horse while riding the horse. To attach the tethers, a rider must hold the horse in place while a second person attaches the tethers. The requirement to use at least two persons is undesirable.

Further, as illustrated in FIG. 1, the two tethers of the Wehrell System traverse the complete track from side to side. This configuration does not allow other horses to be on the same training track and either pass or be passed by the horse being trained as tethers 43 and 44 will strike anything above pivoting member 47.

The use of two tethers requires the simultaneous cooperation of two restraining devices. Such cooperation and simultaneous operations increases the complexity of the control system.

The exercise system of the present invention generally provides a single tether training system which obviates many of these problems and improves the safety afforded to the animal being trained. With reference to FIGS. 5, 6, and 7, a sprint exercise training system and method suitable for variety of animals, including horses, dogs and humans, provides a restraining force during training to condition an animal to run faster. Exercise track 19 may be defined by spaced apart guide rails 8 and 9. Guide rails 8 and 9 may be linear, curved, or define a continuous circular training area. An exercise or training path is specifically defined by a single elevated monorail 20. The monorail slidably carries a restraining device 1 for providing a restraining force Fr opposing and generally directly behind an animal's direction of movement along the exercise path. A harness 21 conveys the restraining force from the restraining assembly to the moving animal. An animal using the present invention may be conditioned to run faster when not subjected to the restraining force. Upper monorail 20 slidably carries restraining device 1 which provides net force (Fr) restraining an animal running on the exercise track 19. Restraining device 1 may propel itself in either direction on monorail 20 in an effort to maintain a constant restraining force on the tethered animal as the animal accelerates and decelerates during training. The use of an elastic tether 5 assist to buffer the animal's acceleration and deceleration. Overhead trolley boom 3 connected to restraining device 1 carries trolley 4 which may move laterally along the length of trolley boom 3 as the animal and restraining device 1 travel around training track 19. The lateral movement of trolley 4 permits training the animal using a single tether 5. Tether 5 attaches to trolley 4 and harness pivoting boom 6 and remain approximately parallel and in-line with horse's body as the horse shifts laterally between guide rails 8 and 9.

The present invention provides desired and appropriate strenuous physical activity such that to condition the animal's body to a higher level of resistance so that the animal can more efficiently perform the sprinting function under normal conditions.

Accordingly, it is an object of the present invention to provide a novel monorail exercise training system for animals which obviates many of the problems and disadvantages of the prior art training systems.

It is another object of the present invention to provide a novel single tether monorail training system for an animal providing a restraining force generally in alignment with the movement of the animal.

It is yet another object of the present invention to provide a novel single elevated rail training system having the training path defined by a single elevated rail.

It is still another object of the present invention to provide a novel sprint training system with improved animal safety in which a restraining tether tension is continuously monitored.

It is a further object of the present invention to provide a novel sprint training system that provides improved realism in training by permitting an animal undergoing training to pass and to be passed by other animals on the training track.

It is yet a further object of the present invention to provide a novel animal training systems defined by a closed path that facilitates training plural animals simultaneously.

It is still a further object of the present invention to provide a novel animal training system that monitors various training and animal parameters and, via telemetry, provides real-time analysis of animal performance.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIGS. 9A, 9B, and 9C depicts an embodiment of the harness assembly of the present invention.

FIG. 10 illustrates the present invention in a training scenario.

DESCRIPTION OF PREFERRED EMBODIMENTS

Figure 5:
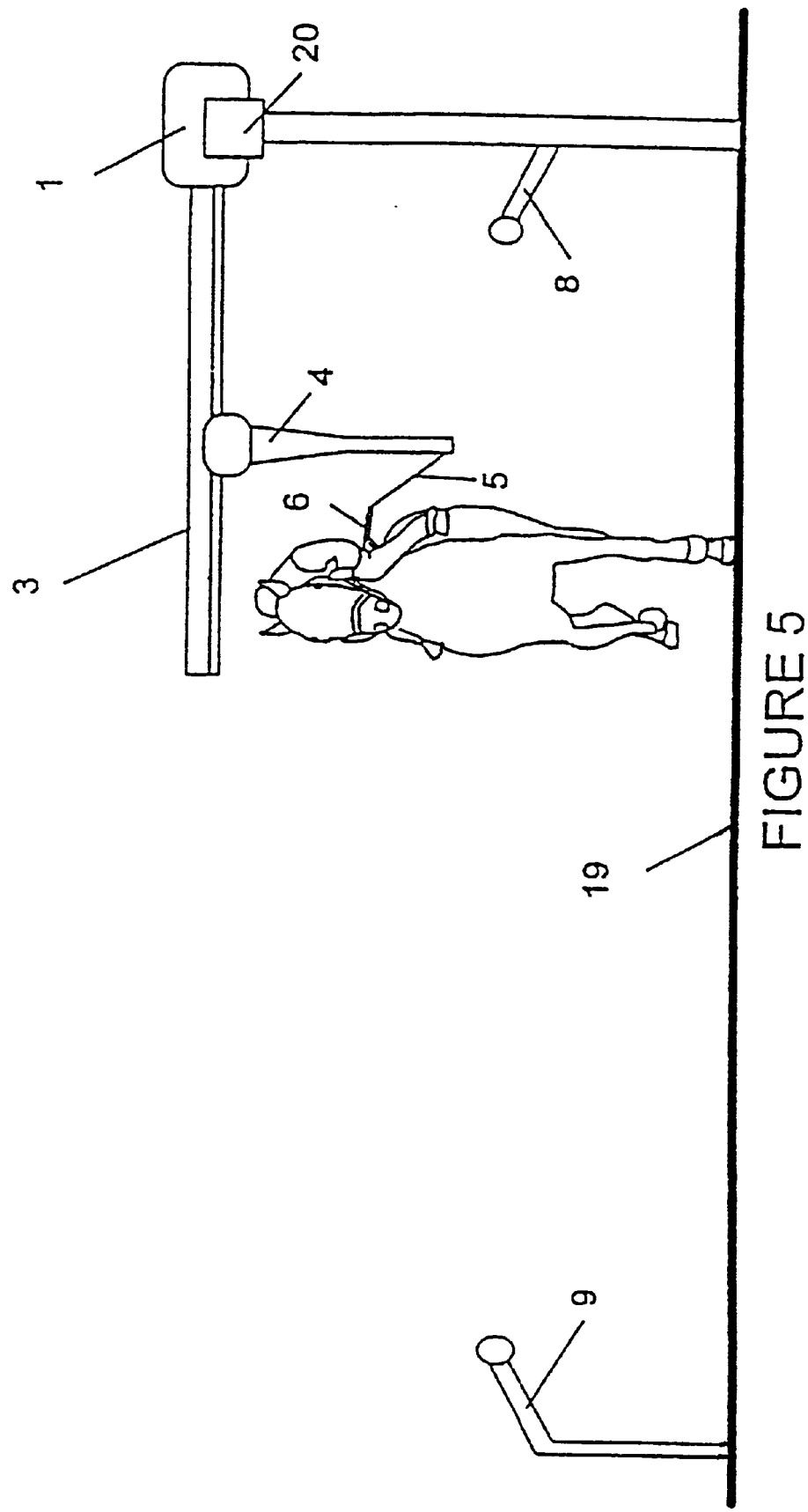
FIG. 5 is a frontal depiction of one embodiment of the present invention.
Figure 6:
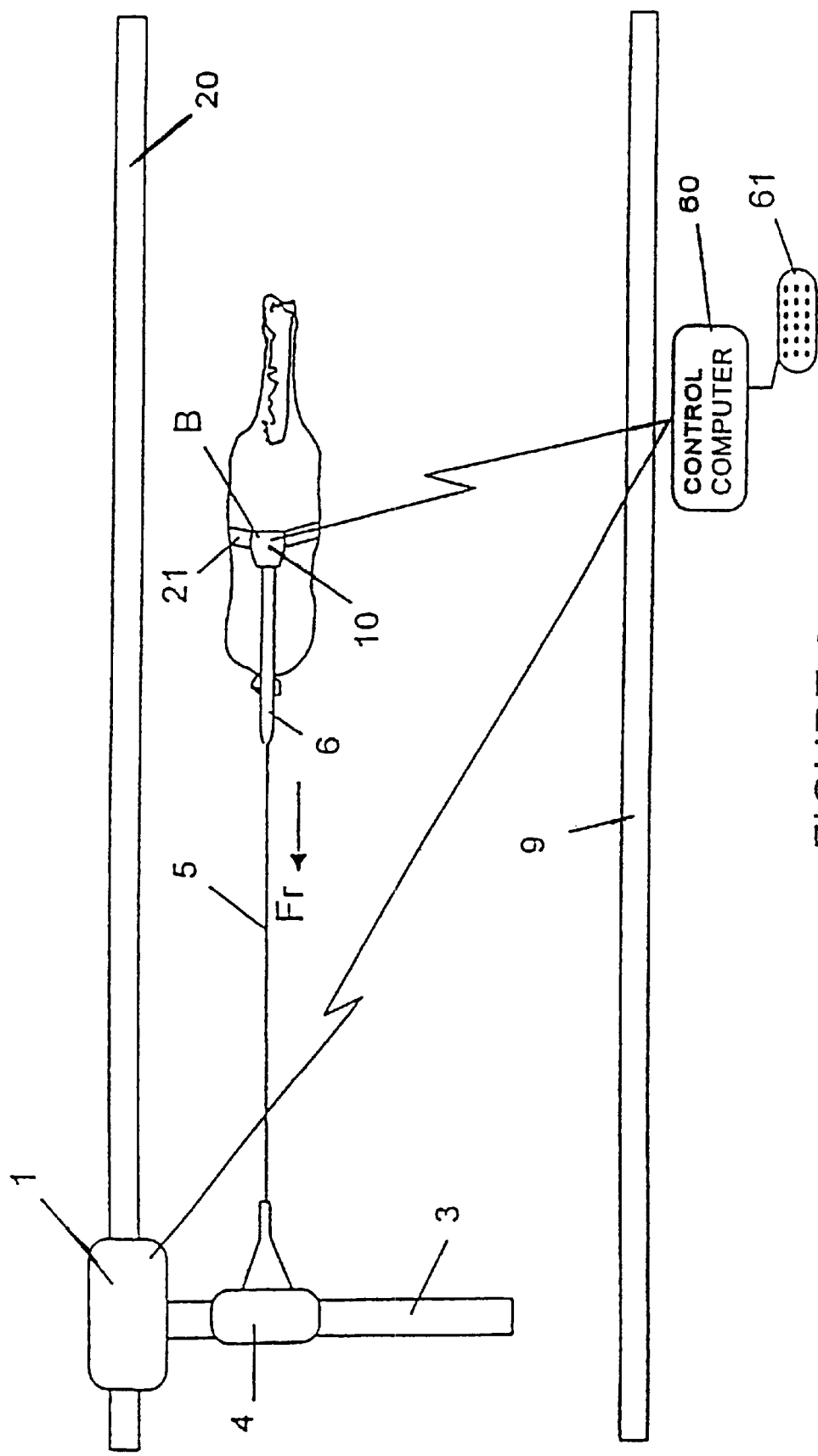
FIG. 6 is an overview view of FIG. 5.
Figure 7:
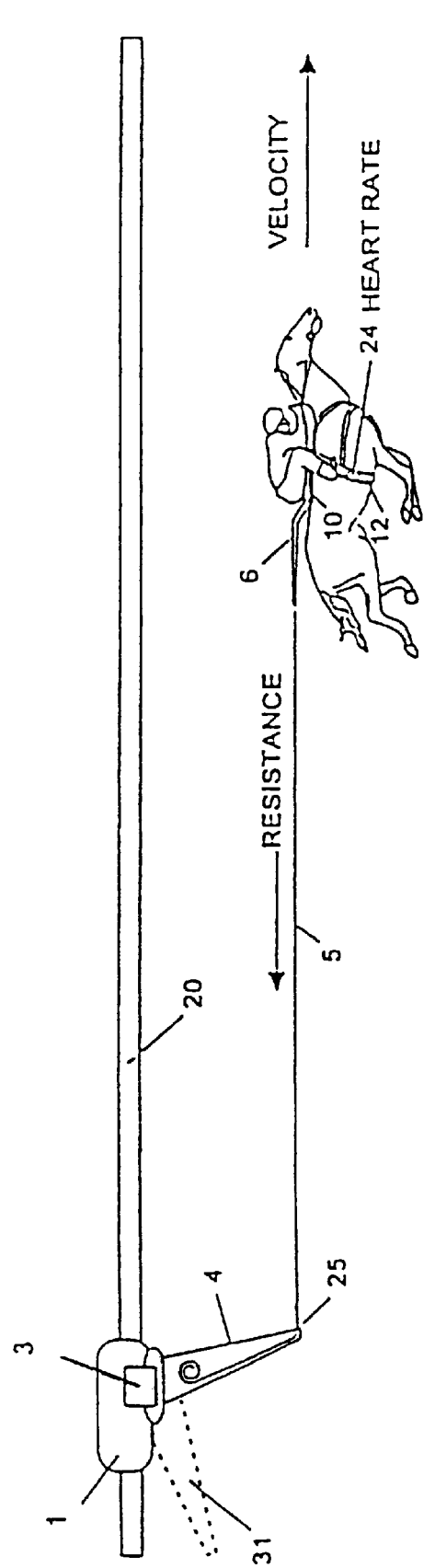
FIG. 7 is a side view of FIG. 5.

With reference now to the figures where like elements have been given like numerical designation to facilitate an understanding of the present invention, and particularly with reference to an embodiment of the single tether training system illustrated in FIGS. 5, 6, and 7, the present invention may include restraining device 1 resting upon monorail 20. Monorail 20 may be elevated high enough such that trolley boom 3 extends over training track 19 without presenting an obstacle to other animals present on training track 19. Attached to trolley boom 3 is slidable trolley 4 which may traverse the length of trolley boom 3. Single tether 5 attaches to trolley 4 and to pivoting boom 6. FIG. 6 presents a partial top view and FIG. 7 present a partial side view of this embodiment.

Electronics module 10 attaches to pivoting boom 6 and communicates with the system main control computer 60. Control computer 60 may provide for operator (trainer) input.

Figure 8:
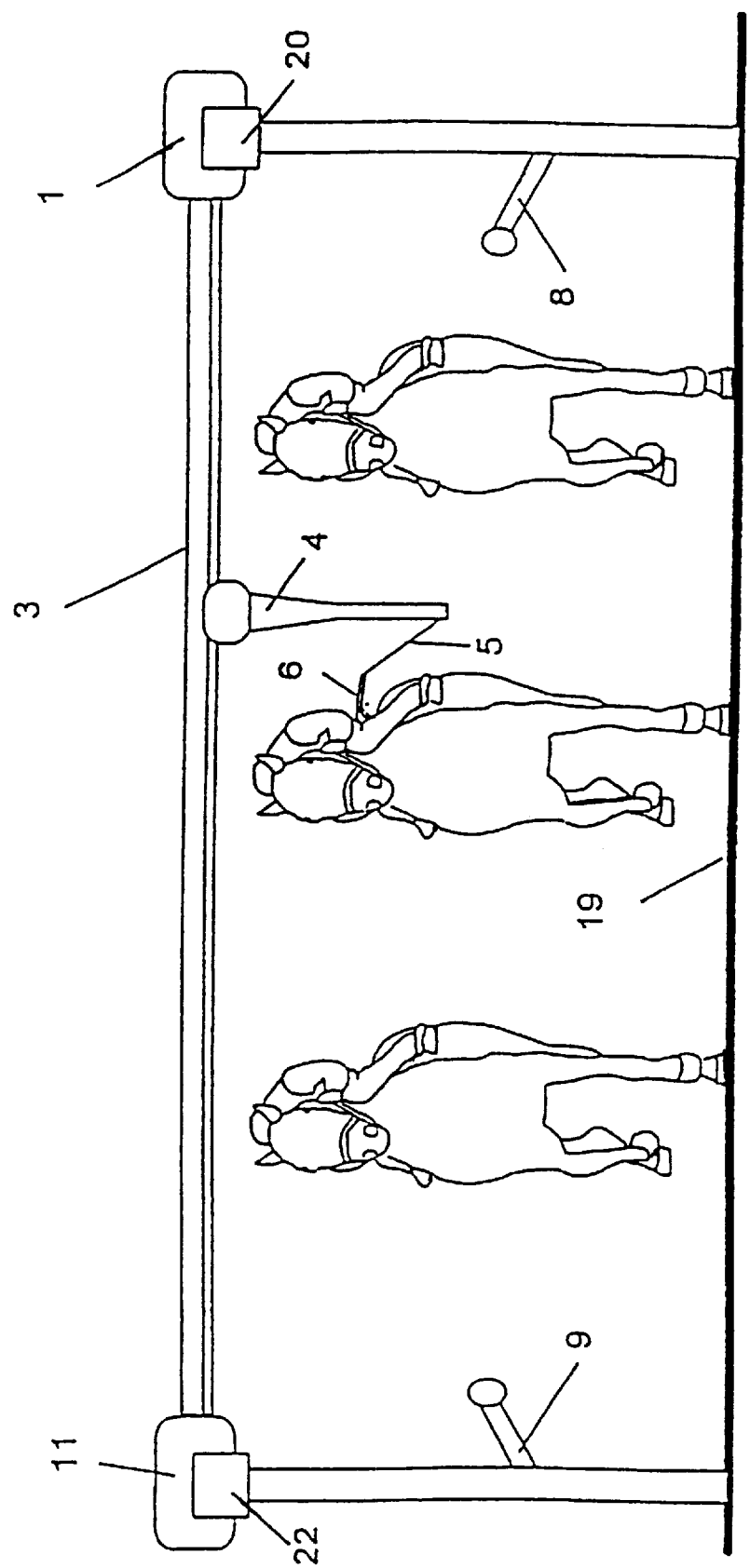
FIG. 8 is a frontal pictorial illustration of another embodiment of the present invention.

With reference to FIG. 8, in a second embodiment of the present invention a second restraining device 11 may optionally connect to and stabilize trolley boom 3. In this embodiment, trolley boom 3 traverses the training complete lateral training as defined by guide rails 8 and 9.

FIG. 8 illustrates one advantage of the present invention over the prior art in that the animal using the training system may be trained with additional animals on the track. This may improve training by making the exercises more closely resemble racing conditions. Advantageously, trolley 4 and tether 5 always directed to travel directly behind the animal, and all other training space over training track area 19 is available to other animals without the training system of the present invention introducing any obstacle. Accordingly, the present invention allows the attached animal to safely pass or be passed by other animals on the training track.

Figure 1:
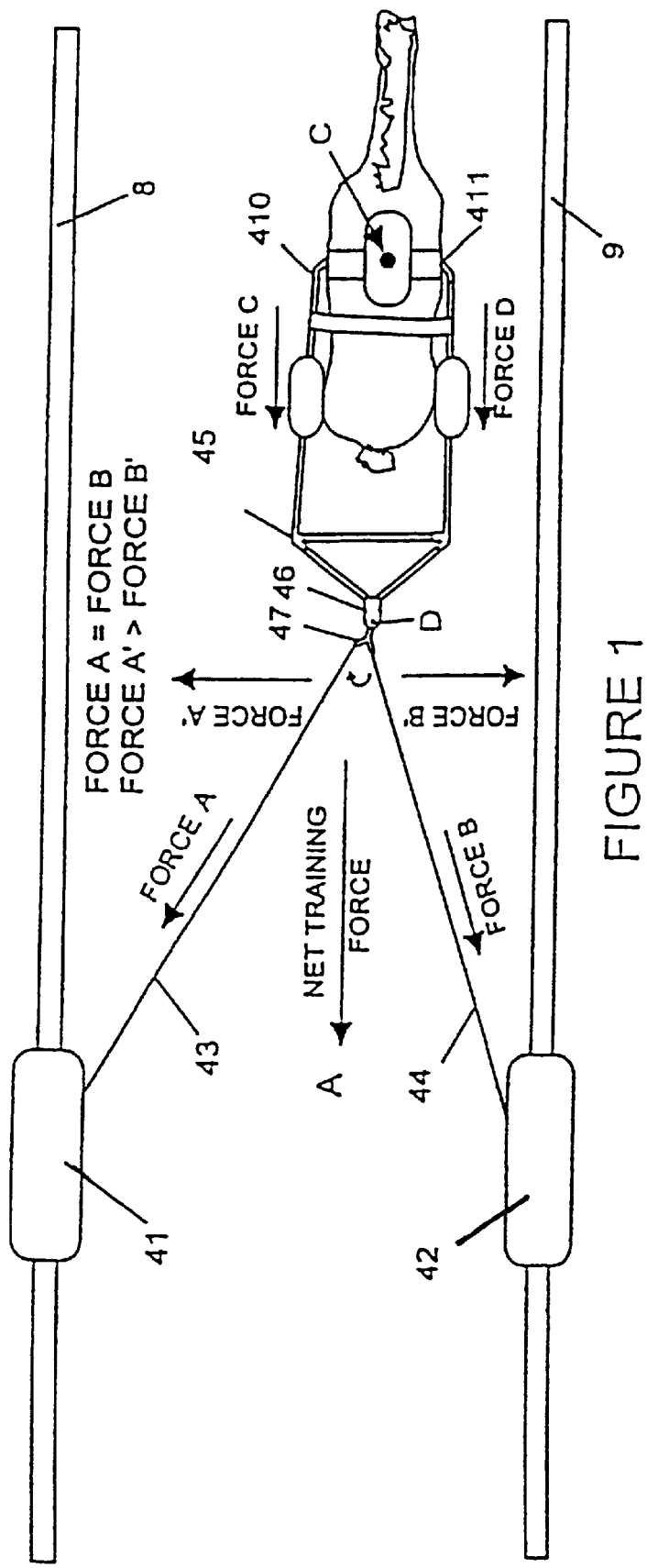
FIG. 1 is a pictorial illustration of a prior art training system for a large animal such as a horse.
Figure 2:
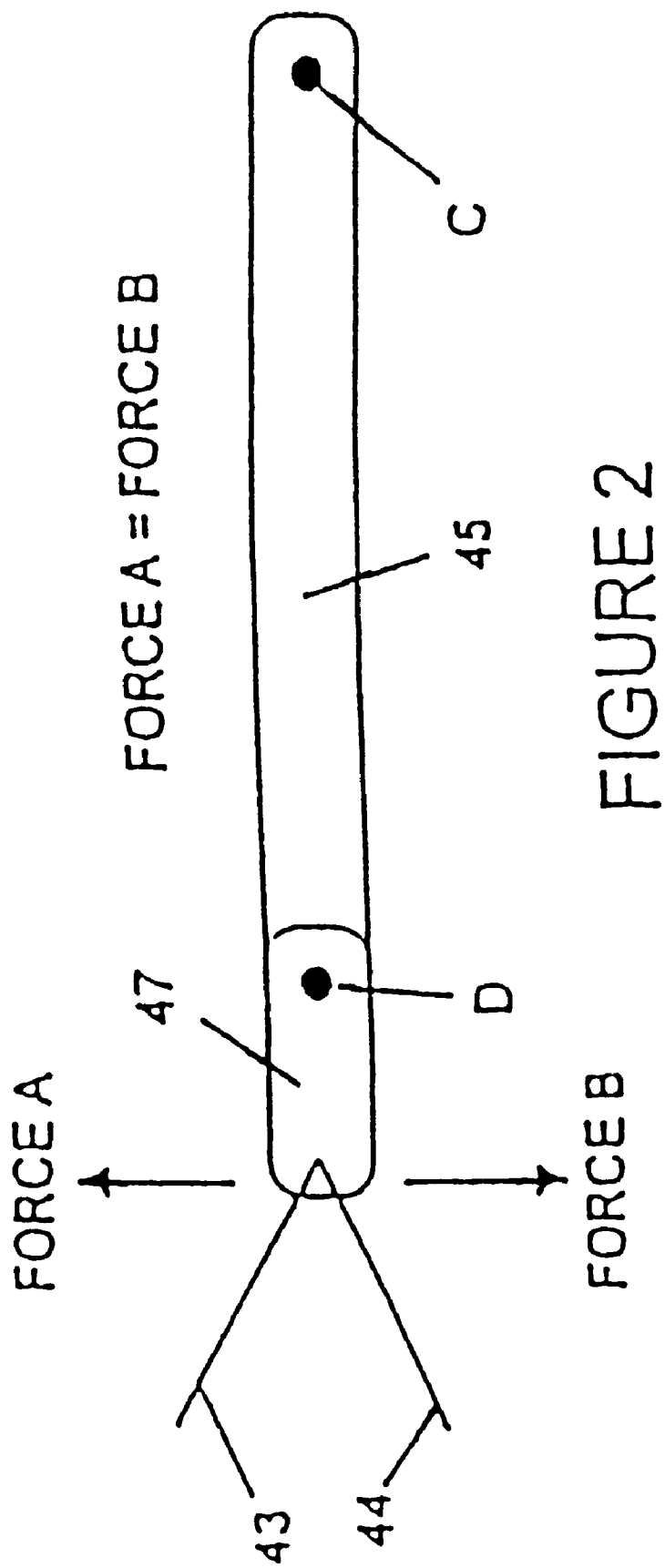
FIGS. 2, 3, and 4 variously model the Wehrell Harness under directed operating conditions.
Figure 3:
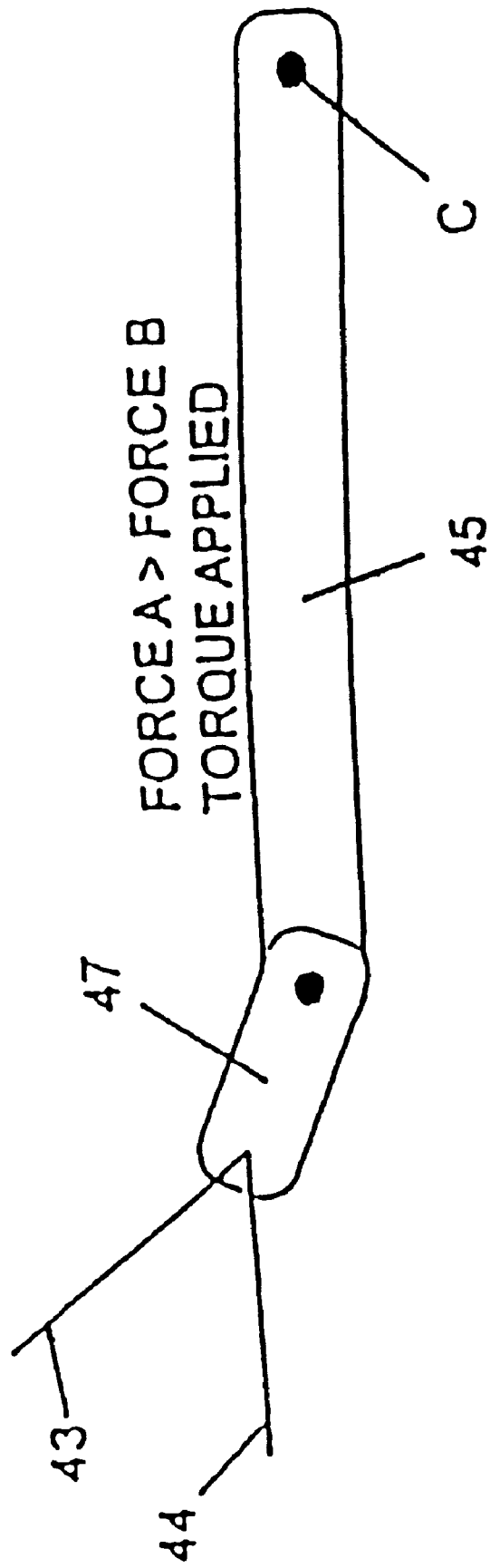
Figure 4:
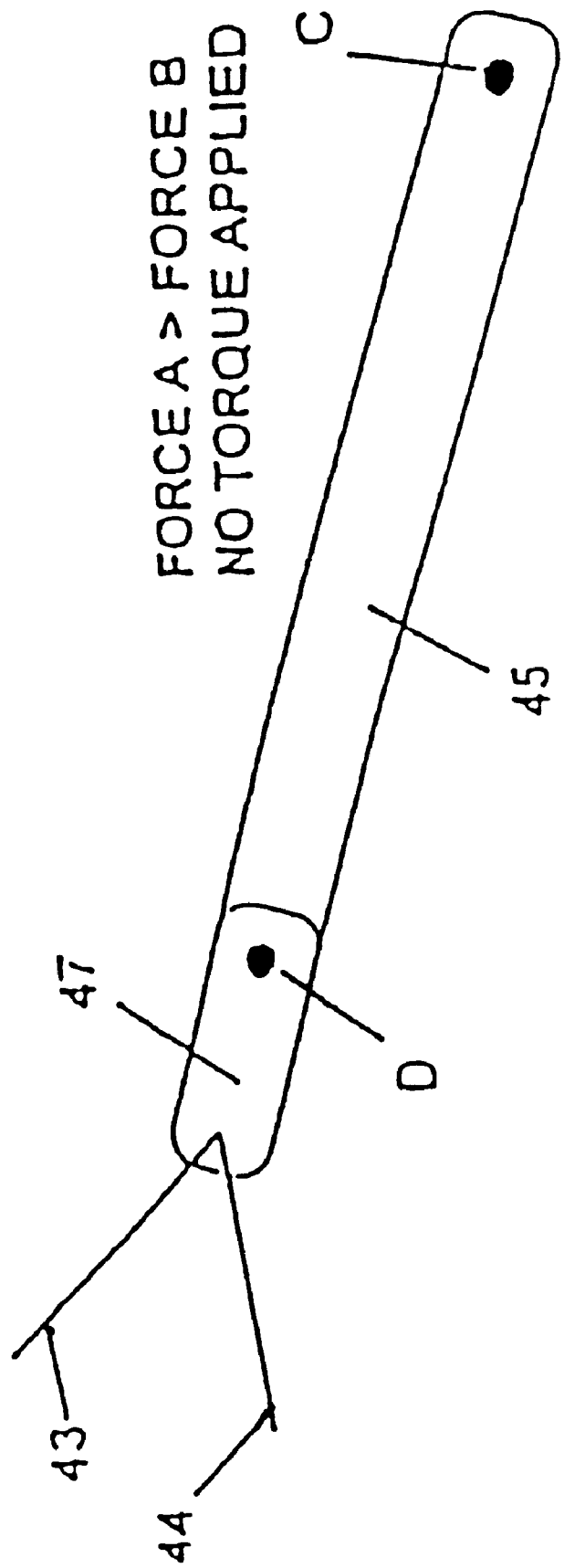

With reference to FIGS. 9A, 9B, and 9C, an embodiment of the present invention includes a novel harness assembly which circumvents many problems associated with the prior art harnesses. Straps 12 and 16 provide a restraining means to secure electronics module 10 and pivoting boom 6 to the animal. FIG. 9A illustrates pivoting boom 6 on the animal's centerline C if Net Force F1 is directed along animal's centerline C. FIG. 9B illustrates that when a net Force F2 is directed off the animal's centerline C, pivoting boom 6 pivots towards the direction of any net force. As pivoting boom 6 may advantageously freely rotate about pivot point D, pivoting boom 6 presents an improvement over the prior art by responsively rotating towards the direction of a net force without placing any torque on the animal. This embodiment additionally overcomes the prior art problems of: 1) rigid harness 45 (FIG. 1) pressing against the animal when a net force is applied to pivot point D and 2) the danger of rigid harness 45 striking guide rails 8 or 9 and causing the system to become unstable.

Electronic equipment in electronics module 10 resolves the angular position of pivoting boom 6 relative to centerline C, providing an error signal for trolley 4 and computer 60. Trolley 4 may responsively receive an electronic command to reposition itself on trolley boom 3 and thus re-align pivoting boom 6 on the animal's centerline C.

In one embodiment of the present invention, safety is improved over the prior art by the use of an elastic tether in further combination with release mechanism 15 attached to pivoting boom 6. Tether 5 advantageously has elastic properties to buffer changes in the horse's speed and obviate the requirement for restraining device 1 to provide instantaneous acceleration responsive to changes in the horse's speed. Release mechanism 15 provides further safety to the animal being trained by permitting the selective release of tether 5 from the harness. Release mechanism 15 may be activated upon computer or rider command thus providing both remote automatic as well as local rider control.

With reference to FIG. 9C, animal harness 21 may include padding 14 to cushion electronics package 10 on animal's back. Pivot axis 13 permits pivoting boom 6 to pivot vertically to allow for the rocking action of the running animal.

In an alternative embodiment of the present invention, animal harness 21 includes electronics package 10 and pivot axis 13 with release mechanism 15 connected thereto. Pivot axis 13 and release mechanism 15 may consist of a single unit. Pivot boom 6 is attached directed to trolley 4. In this embodiment, tether 5 feeds from the recoiler 35 via pivotable boom 6 to release mechanism 15 on animal harness 21. This embodiment desirably reduces harness 21 weight on the animal being trained. FIG. 10 illustrates the operation of one embodiment of the present invention in an actual training scenario. In the interest of clarity, the rider is not shown. With the horse in position A and trolley 4 directly behind the horse in position 1, tether 5 is in-line with the horse's centerline. In this alignment there will be no net force acting to the left or right of the horse. If the horse begins to shift towards the left side of the track, as shown in FIG. 10 by the transition horse figure, the horse is no longer aligned with trolley 4. As the horse leaves alignment with trolley 4, tether 5 begins to apply a net force pulling from the right side of the horse. The net force will cause pivoting boom 6 to rotate slightly counter clockwise as indicated with the center transition figure. Electronics module 10 detects the angular shift in pivoting boom 6. The angular shift information serves as telemetry input to instruct trolley 4 to move laterally along trolley boom 3 to reposition trolley 4 in alignment with the animal at position 2, thereby re-aligning pivoting boom 6 on the animal's centerline. The operation of the invention is to maintain the alignment of the trolley and tether directly behind the animal, and thus avoids any net force acting to the left or right of the animal.

With reference to FIG. 7, in yet another embodiment of the present invention, training resistance (tether tension), velocity, restraining device location, and heart rate of the training animal may be measured. Heart monitor 24 embedded in saddle strap 12 measures heart rate. Electronics package 10 monitors tension applied to pivoting boom 6 by tether 5. Detector 25 attached to trolley 4 may also measure resistance applied to pivoting boom 6 by tether 5. Restraining device 1, traveling at the same speed as the horse, may include means to measure velocity over monorail 20. The location of restraining device 1 on monorail 20 may be by optical receiver or other means known in the art.

Figure 11:
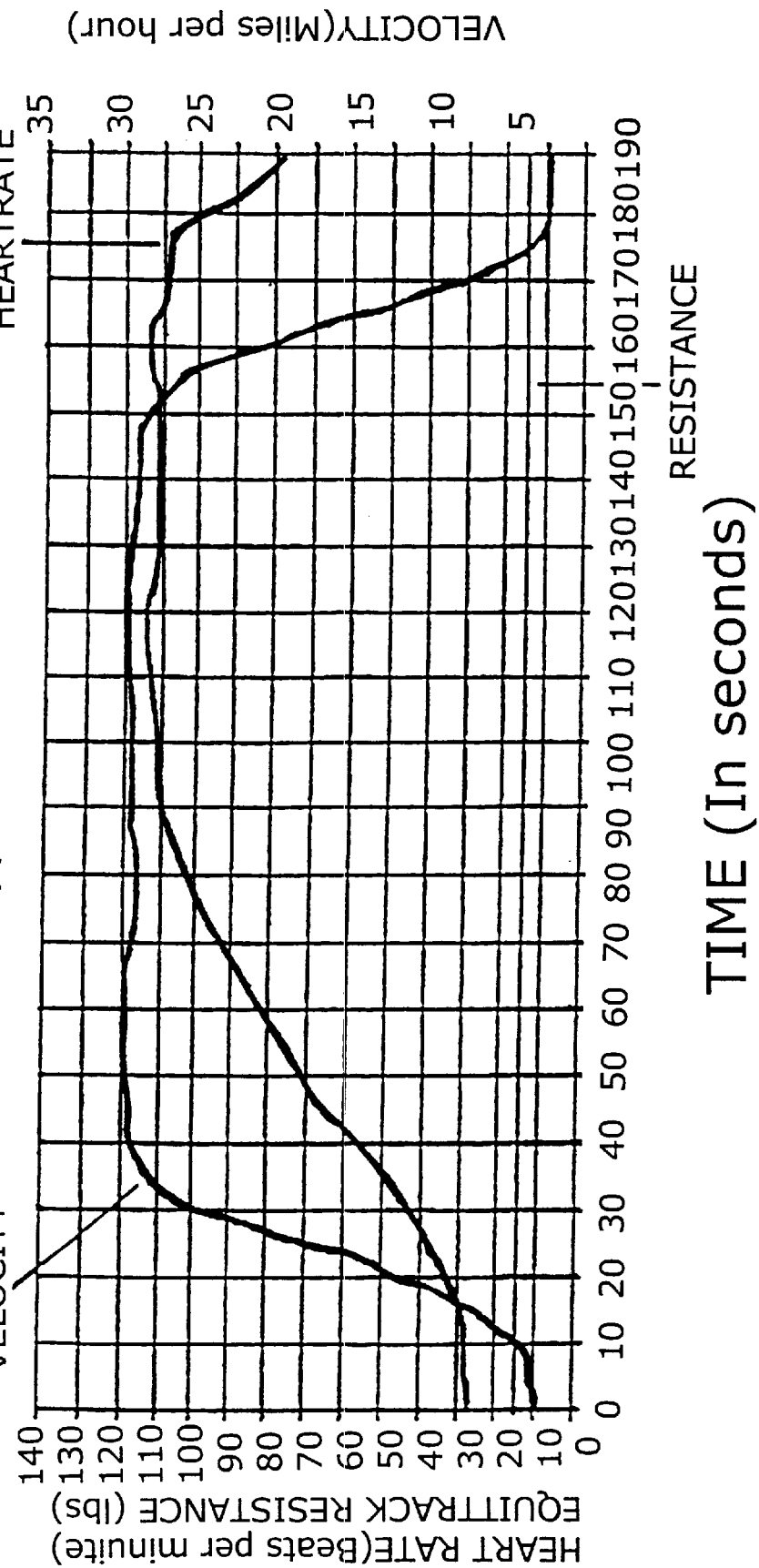
FIG. 11 is an exemplary telemetry output printout.

With reference to FIG. 11, the present invention may record electronic telemetry outputs for, e.g., tether resistance, heart rate, velocity, boom angular displacement, variously from electronics package 10, restraining device 1, heart rate detector 24 and tension detector 25. The real-time data therefrom may then be used to plot various training responses. The present invention thus allows trainers to adapt the training program based on animal responses a previous program. Since the data is obtained in a real-time fashion and is highly accurate, the animal can be closely monitored during training thereby providing an additional safeguard to the animal while subject to the restraining force. Known prior art systems do not thus retrieve and apply these parameters from an animal on a open training track.

Figure 12:
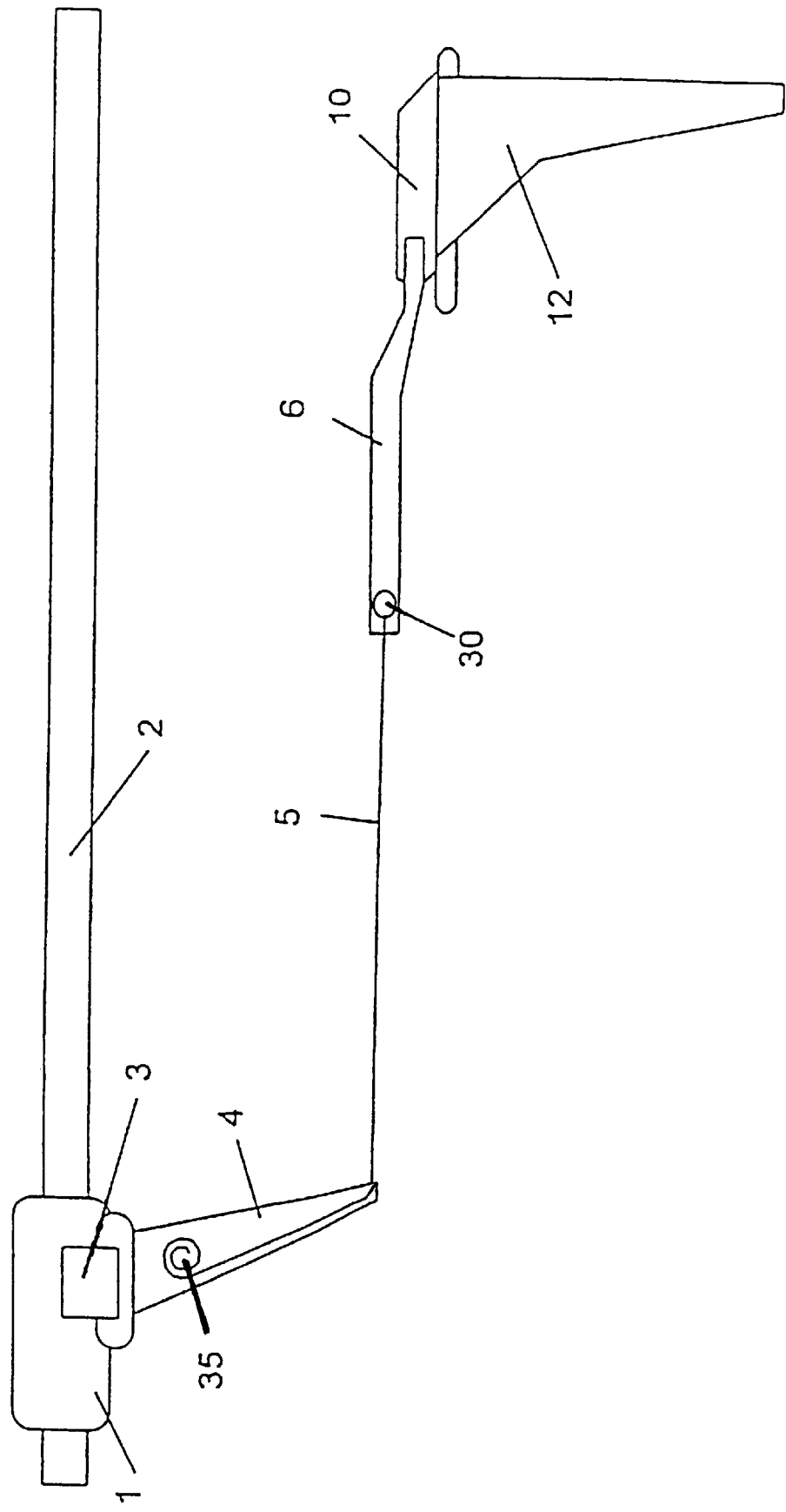
FIG. 12 illustrates the recoiler of one embodiment of the invention providing a tether to an animal harness assembly.

With reference to FIG. 12, an alternative embodiment of the invention includes recoiler 35 embedded in trolley 4 or alternatively in restraining device 1 to recoil tether 5. Tether 5 may be desirably recoiled after being detached from the animal after completing a training session or upon activation of release mechanism 15 (previously shown on FIG. 9C). Attachment connector 30 secured on an end of tether 5 may readily be grasped by a rider while on the horse and attached to pivoting boom 6. The attachment may be facilitated by means of a slotted grove in pivoting boom 6, by snap connection to release mechanism 15, or by another means know in the art. Attachment connector 30 advantageously allows the rider to attach tether 5 without dismounting or requiring the assistance of a second person.

Figure 13:
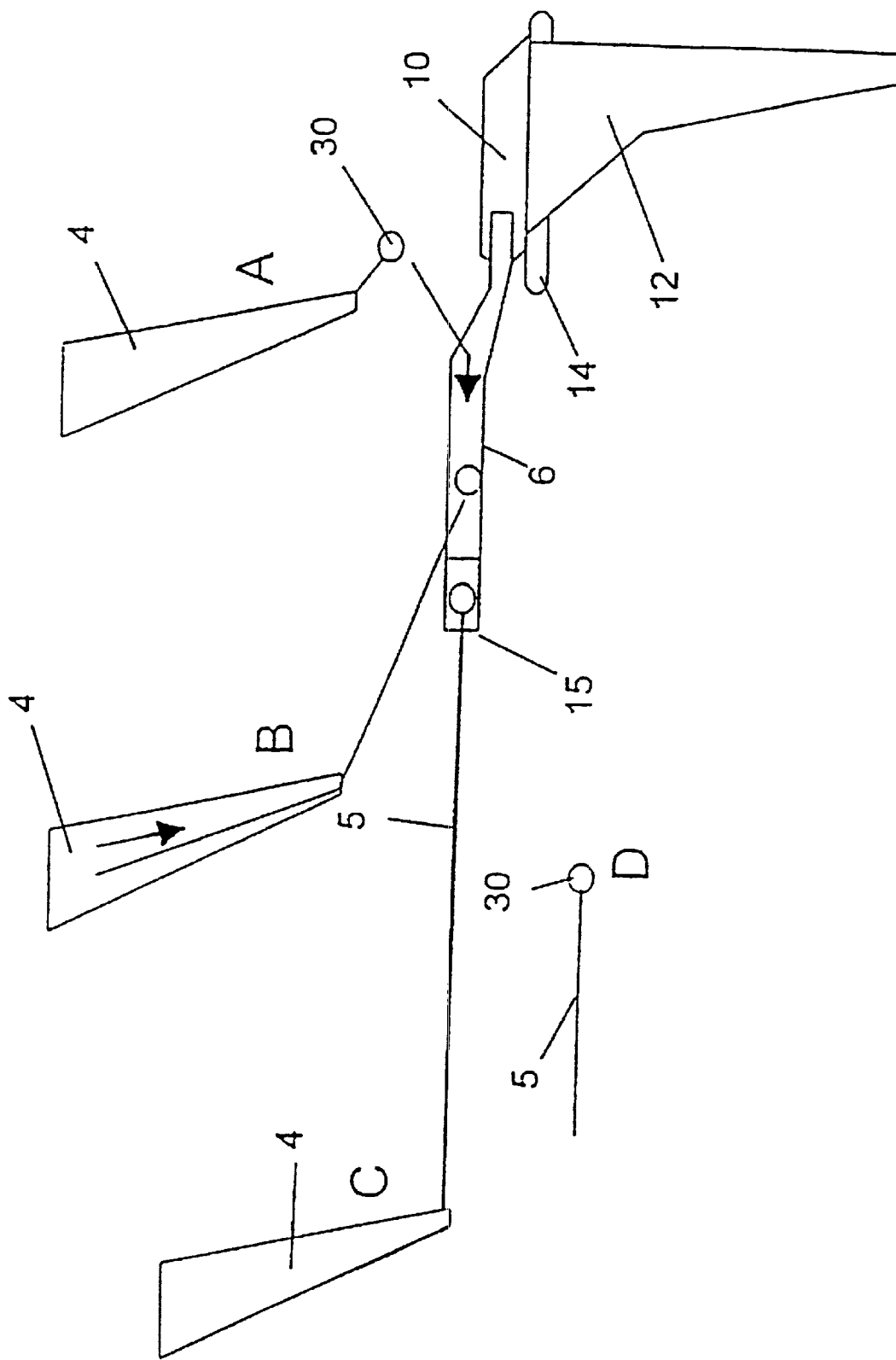
FIG. 13 illustrates an embodiment of the invention's tether connector being joined with an animal harness assembly.

With reference to FIG. 13, recoiler 35 allows tether 5 to unwind and be extracted from trolley 4. After the rider attaches connector 30 to pivoting boom 6 and the horse is a safe distance from trolley 4 (20 to 60 feet), the recoil device may automatically lock in position. As tether 5 becomes tight, restraining device 1, trolley boom 3 and trolley 4 will begin to move with the horse and apply the resistance programmed by the command console 61 of computer 60.

FIG. 13 illustrates a method of the invention, using slotted pivoting boom 6, to easily facilitate connecting tether 5 and the animal. The rider, after moving the horse alone the stationary trolley 4, takes tether 5 along with connector 30; recoiler 35 allows tether 5 to exit trolley 4; the rider aligns connector 30 with an opening in one end of pivoting boom 6. This activity is represented with trolley 4 at position A. Once the rider releases connector 30 in the slotted groove in pivoting boom 6, the rider instructs the horse to walk forward in front of trolley 4. As the horse moves forward, connector 30 slides along the slotted groove to the end of pivoting boom 6 from position A, through position B, to position C. Once connector 30 moves into position C, connector 30 enters into release mechanism 15. As the rider and horse distance themselves from trolley 4, tether 5 tension will change, signalling recoiler 35 to allow tether 5 to be extracted from trolley 4. As previously described, when the horse is a safe distance from trolley 4, tether 5 is locked and the restraining device initiates the programmed restraining force. Upon completion of a training session, or in a emergency, tether 5 can be released remotely or locally by the rider. In one embodiment, release mechanism 15 will spring open and release connector 30 as shown in position D.

With reference to FIG. 6, operation of the control system of an embodiment of the invention can be appreciated. Pivot position B senses angular boom movement upon the boom responding to any net force acting upon the horse. A position resolver may be included at pivot position B to accurately inform the electronics package 10 as to the exact position of pivoting boom 6. The control system operates to detect pivoting boom 6 shifting off the center axis and, by electronics package 10 causing the transmission of an error signal, trolley 4 is repositioned along trolley boom 3, realigning pivoting boom 6 along the axis of the horse.

The control system allows interaction between the horse, restraining device 1, trolley 4, and trainer's control computer 60.

System control may originate at console 61 of trainer's control computer 60. Console 61 may be remotely located in a position to enable a complete view of the training track. Console 61 is always in direct contact with electronics module 10 and restraining device 1. Using the aforementioned telemetry, control computer 60 and trainer can monitor the horse's performance and provide commands to restraining device 1.

Electronics module 10 may be attached to the horse and transmit plural telemetries as well as receive a release signal for release mechanism 15. These telemetries may include:

1. Harness resistance telemetry. This telemetry may be sent to both restraining device 1 and trainer's control computer 60 to continually monitor and control the training resistance applied via tether 5. A force sensor within pivoting boom 6 may produce this signal.

2. Boom position telemetry. This telemetry may be sent to both restraining device 1 and trainer's control computer 60 to continually monitor the position of the horse. Any movement off centerline will cause trolley 4 to adjust laterally along trolley boom 3.

3. Heart Rate Telemetry. The horse heart rate telemetry, monitored by heart rate monitor 24 is sent to computer 60 for uses such as measuring heart rate data Vs as a cardiovascular conditioning response to system resistance.

4. Harness Status. Electronics module 10 may include a microprocessor and may automatically check all functions within module 10 to insure proper functioning during training sessions. This telemetry is sent to computer 60 to provide an on-going status. The system may be programmed that, upon sensing a harness status failure, release mechanism 15 is activated and tether 5 is released from the horse. Additionally, the system can be programmed to not allow its operation unless the harness status indicates all functions are operating properly.

5. Emergency Tether Release Command. An emergency tether release command may advantageously be received at electronics module 10 from either restraining device 1 or trainer's control computer 60 as well as locally from the rider. Upon receipt of an emergency tether release command, tether 5 resistance is reduced, for example to less than 5 pounds, and release mechanism 15 is activated. Reducing tether 5 resistance prior to activating release mechanism 15, assures the horse will not stumble when tether 5 is disconnected.

In an embodiment, restraining device 1 may include a linear induction motor to propel the device in either direction on monorail 20 allowing the maintenance of a resistance on the horse as it trains. The motor is selected to be highly reliable and completely silent so as not to frighten the horse. Restraining device 1 may be supported by a magnetic field over monorail 20 and may include an on-board computer capable of instantly taking over and performing trainer's control computer 60 functions. Telemetries and commands which may be provided at restraining device 1 include:

1. Tether Tension Telemetry. Tether tension is desirably measured within an accuracy of 1 pound. This tension measurement should equal the harness tension measurement and may serve as either a backup or a safety means.

2. Velocity Telemetry. Velocity is sent to computer 60 and indicates the speed of restraining device 1 and the horse. An accuracy of ½ mile per hour is desirable.

3. Device Status Telemetry. Device status is sent to computer 60 and indicates the status of all vital components to ensure proper operation. Similar to the harness status telemetry, out-of-tolerance conditions may automatically shut the system off and release tether 5.

4. Emergency Tether Release Command. Restraining device 1 will transmit a tether release command to electronic module 10 if a serious condition is detected within restraining device 1.

5. Emergency Shutdown/Tether Release Command. Trainer's computer 60 independently may detect a system problem and originate an emergency shutdown/tether release command which command is sent to both restraining device 1 and release mechanism 15.

6. Resistance Command. The trainer may optionally set an initial tether resistance which trainer's computer 60 transmits to restraining device 1. Restraining device 1 will adjust the device location and tether tension to achieve the desired tether resistance.

7. System Power On/Off Command. The trainer may optionally power on and off restraining device 1 may transmitted a power on/off command. This provides an enhanced level of safety to the horse being trained.

8. Trolley Position Command. Trainer's computer 60 upon receipt of the boom position telemetry previously discussed, computes the position of trolley 4 on trolley boom 3. If an adjustment of location is required, computer 60 sends a signal to restraining device 1 to cause trolley 4 to be repositioned along trolley boom 3. Restraining device 1 independently may compute trolley 4 position from the boom position telemetry and calculate an independent repositioning signal. The two commands may be compared, in one embodiment 10 times per second, to ensure both components are operating properly.

FIG. 7 further illustrates recoiler 35 may automatically recoil tether 5 to remove it from the track after tether 5 is released from release mechanism 15. Upon release of tether 5 from release mechanism 15, arm 31 of trolley 4 may swing into a approximately horizontal position (shown in phantom).

Figure 14:
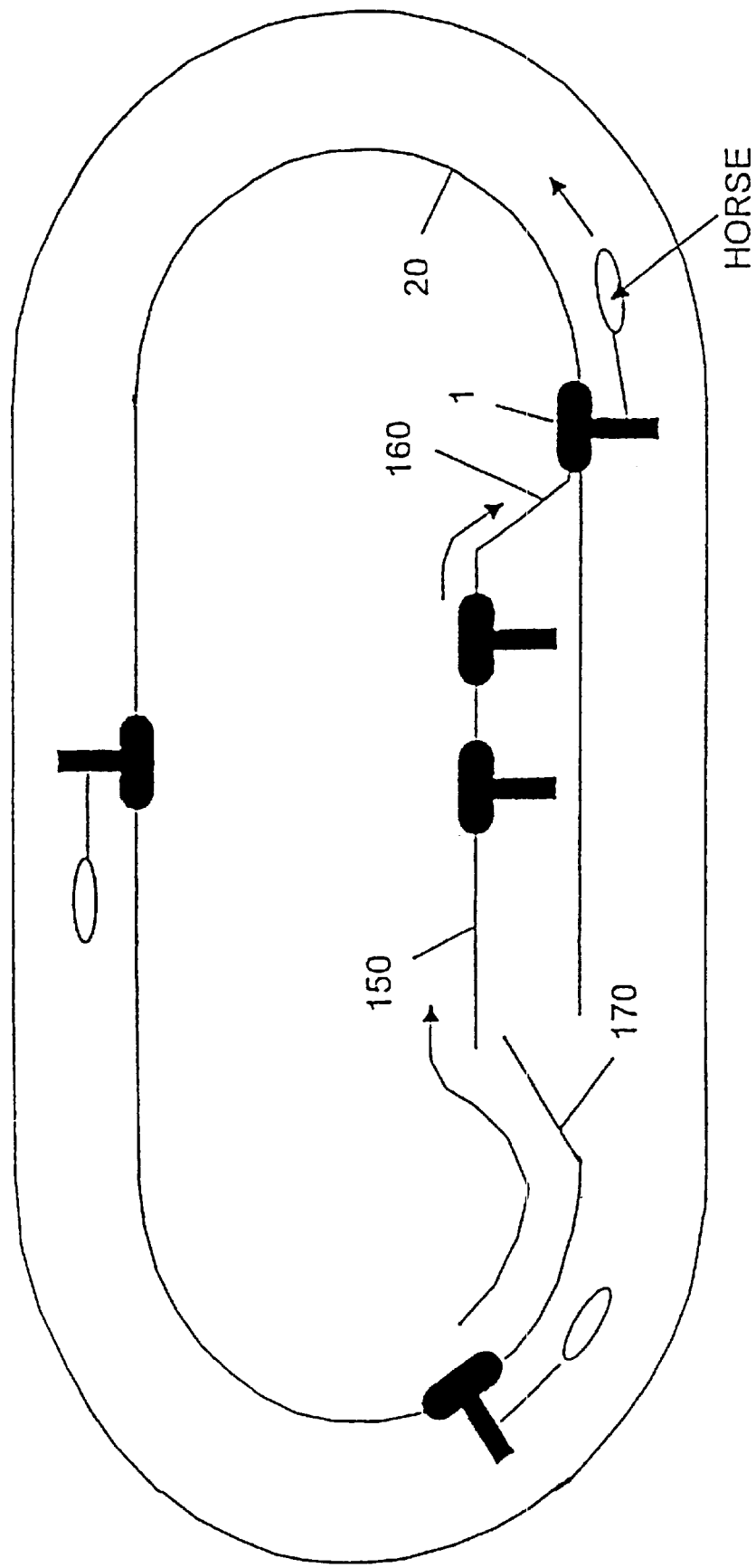
FIG. 14 illustrates additional restraining assembly options.

With reference to FIG. 14, one closed-loop configuration of the present invention is shown. In this embodiment, a first restraining device 1 is utilized on the inner monorail 20.

FIG. 14 further illustrates another embodiment of the invention representing a significant improvement to the art, wherein the training system permits automatically reconfiguration to train multiple horses at one time. A standby guide rail 150 supports plural restraining devices 1 configured with booms 3 and trolleys 4. Main monorail 20 includes an additional segment of track 160 which may be fixed or moveable, either manually or via computer command, and can switch and connect to standby guide rail 150. Control computer 60 can command a number of restraining devices 1 onto monorail 20 and space them a selectable distant apart.

FIG. 14 additionally depicts a track configured to train three horses at once. Upon setting up the track, restraining devices 1 move into place and then stop to await riders to connect tethers 5. All horses then begin their respective training programs with the aforementioned safety features assuring adequate spacing between each horse.

FIG. 14 depicts yet another embodiment of the invention with a further section of track 170 connected to standby track 150. Track 170 may be used to unload and store restraining devices 1 after training is complete.

Figure 15:
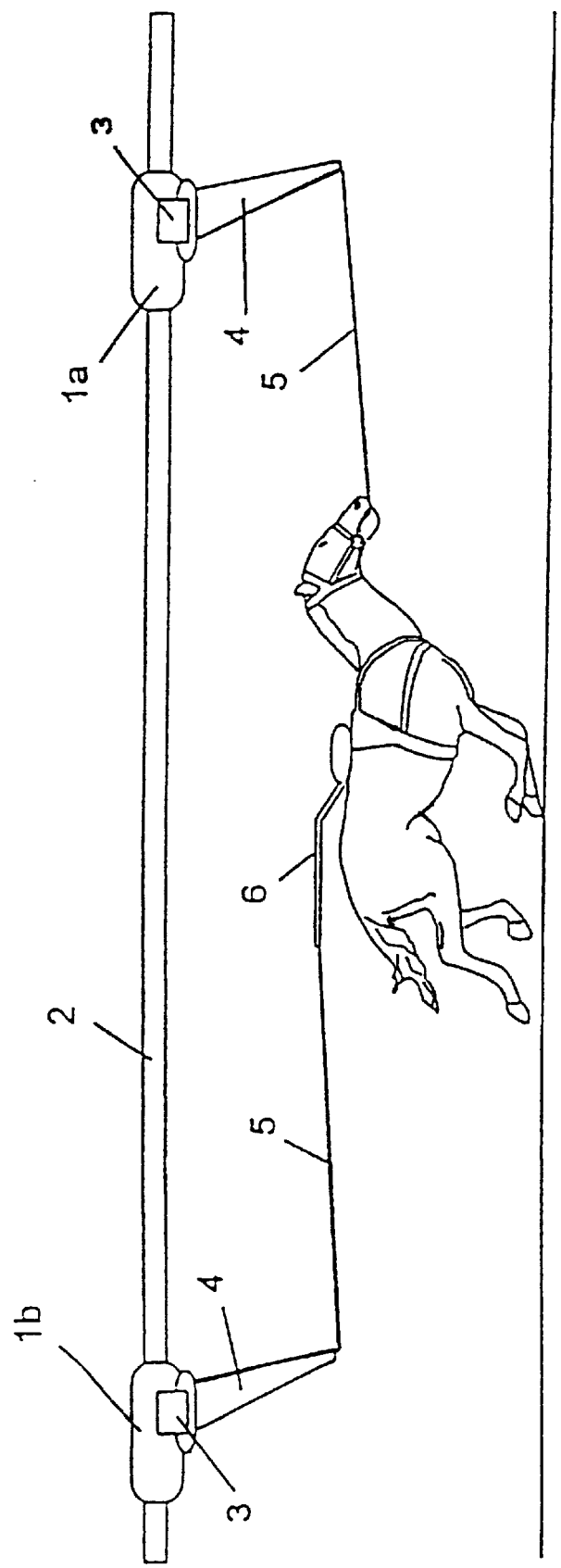
FIG. 15 depicts an embodiment of the present invention utilizing two retraining assemblies to walk an animal.

In another embodiment of the invention, shown by FIG. 15, a horse, without a rider, may be tethered between two restraining devices 1, the two restraining devices operating cooperatively to allow the horse to walk and exercise without a trainer or rider. In this embodiment, the horse is tethered between two restraining devices 1. The forward restraining device 1a may be programmed to initially provide a limited forward resistance to the horse's bridle and thereby encourage the horse to begin its walk. As the horse begins to walk, the rear restraining device 1b will be towed behind the horse. Once the horse has begun to walk, trainer's control computer 60 or optionally the two restraining devices' computers, will adjust the forward restraining device's speed and the rear restraining device's speed to match the horse's own speed. The co-ordination of the horses speed with the speed of the restraining devices will reduce the bridle tension to near zero pounds.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An exercise system for conditioning a moving animal comprising:
    elevated monorail defining a permitted path of movement;
    restraining assembly, slidably carried by said monorail for providing a restraining force, said restraining assembly comprising,
        restraining device, slidably carried by said monorail for controllably moving said restraining assembly along said monorail,
        trolley boom, fixedly attached to said restraining device and extending outward from said monorail, and
        trolley, slidably carried by said trolley boom for locating said restraining force along said trolley boom;
    harness assembly for applying said restraining force to an animal moving along said path, said harness assembly comprising,
        tether connected to said trolley and terminating with a tether connector for conveying said restraining force,
        pivotable boom connecting said tether connector for conveying said restraining force,
        animal harness for restraining said animal moving along said path, and
        pivot assembly mounted an said animal harness and connected to said pivotable boom for transferring said restraining force from said boom to said animal harness; and
    control means for varying said restraining force and selectably locating said trolley along said trolley boom to provide a regulated restraining force generally aligned behind said animal.

2. The system of claim 1, further comprising:
    auxiliary elevated monorail spaced apart from said first elevated monorail further defining a permitted path of movement;
    auxiliary restraining device, slidably carried by said auxiliary elevated monorail and fixedly attached to said trolley boom for allowing the trolley to transverse the area between said elevated monorail and said auxiliary elevated monorail and cooperative control means for operating said auxiliary restraining device with said restraining device to jointly maintain a restraining force on said animal.

3. The system of claim 1, further comprising: aligning means for locating said trolley along said trolley boom to generally align said restraining force directly behind said animal.

4. The system of claim 3, wherein said aligning means comprises:
    trolley position detector for determining the position of said trolley on said trolley boom;
    angular position detector operatively connected to said pivotable boom for determining the angular position of said pivotable boom relative to the direction of movement of said animal; and
    location control means operatively connected to said trolley position detector and said angular position for determining a revised position for locating said trolley along said trolley boom such that said revised position generally aligns said restraining force directly behind said animal.

5. The system of claim 1, further comprising:
    tether tension measuring means for measuring said restraining force on said tether; and
    tension control means operatively connected to said tether tension measuring means for maintaining said restraining force at a predetermined value.

6. The system of claim 5, further comprising a tether release mechanism for remotely releasing said tether connector from said pivotable boom.

7. The system of claim 6, wherein said tension control means to:
    (1) determine if tether tension exceeds a pre-selected value,
    (2) determine the occurrence of a system failure,
    (3) monitor for an operator tether release signal, and
    (4) monitor for a computer generated tether release signal, and upon the occurrence of any of said conditions, said tension control means activates said tether release mechanism to remotely release said tether connector from said pivotable boom.

8. The system of claim 6, wherein said tension control means reduces tether tension prior to activation of said tether release mechanism to prevent rapid changes of tension on said tether and animal.

9. The system of claim 5, wherein said tether tension measuring means comprises:
  first tension detector operatively connected to tether connector for measuring tether tension at said harness;
  second tension detector operatively connected to said trolley to measure tether tension at said trolley; and
  comparative circuitry connected to receive said first tension detector measurement results and to receive said second tension detector measurement results for comparing said results.

10. The system of claim 1, further comprising telemetry means for simultaneous parameter reporting, said monitoring means comprising,
  animal heart rate detector for measuring and reporting the animal's heart rate during training,
  restraining device speed detector for measuring and reporting the speed of the animal while training,
  angular displacement sensor for measuring and reporting the displacement of said pivotable boom,
  restraining device acceleration detector for determining and reporting the acceleration of the animal while training, and
  restraining force sensor for measuring and reporting the restraining force applied to the animal,
whereby the animal's condition can be continuously monitored during training.

11. A sprint exercise training system for providing a restraining force on a moving animal comprising:
  elevated railing defining a training path;
  restraining assembly, slidably carried by said elevated railing for providing a restraining force along said training path; and
  harness for conveying said restraining force to an animal moving along said training path, and attached to said restraining assembly, said restraining force opposing the movement of the animal along said training path and comprising substantially all of the force conveyed to said animal by said harness,
  whereby substantially all of said restraining force conveyed to said animal opposes said animal's movement along said training path.

12. The system of claim 11, wherein said restraining assembly comprises:
  restraining device, slidably carried by said elevated railing for controllably moving said restraining assembly along said railing;
  trolley boom, fixedly attached to said restraining device and extending outward from said railing;
  trolley, slidably carried by said trolley boom for locating said restraining force along said trolley boom;
  tether connected to said trolley for conveying said restraining force,
  tether connection attached to said tether for connecting said tether to said harness,
  recoiler operatively connected within said trolley and to said tether to feed and retract said tether into said trolley, and
  control means for varying tether tension and trolley location along said trolley boom.

13. The system of claim 12, wherein said control means further comprises means for controlling said restraining device speed and direction responsive to programmed restraining force and restraining device velocity.

14. The system of claim 11, further comprising:
  second restraining assembly, slidably carried by said elevated railing for providing a second restraining force; and
  auxiliary tether connected to said second restraining assembly and connected to said harness for conveying said second restraining force via said harness to said animal.

15. The system of claim 11, wherein said elevated railing defines a closed training path and further comprising:
  a second elevated railing selectably connectable to said elevated railing to permit said restraining assembly to travel off of and on to said elevated railing;
  second restraining assembly, slidably carried by said elevated railing for training a second animal on said training path.

16. A method for conditioning an animal to run faster comprising the steps of:
  (a) providing a training path defined by an elevated rail;
  (b) slidably mounting a restraining assembly upon said elevated rail defining a training path, for providing a restraining force substantially entirely opposing the direction of an animal training on said path;
  (c) securing upon an animal to be trained to a harness assembly for transferring said restraining force to said animal training along said path, said restraining force comprising substantially all of the force transferred to said animal by said harness assembly;
  (d) providing a connecting tether between said restraining assembly and said harness assembly to allow said restraining force to be transferred to said harness assembly; and
  (e) providing control means for varying said restraining force, sensing the lateral movement of an animal and maintaining said restraining force generally aligned behind said animal,
  whereby said animal trains to run while subjected to said restraining force so that the animal is conditioned to run faster when not subjected to a restraining force.

17. The method of claim 16, wherein the step of slidably mounting a restraining assembly comprises the steps of:
  (a) slidably mounting a restraining device on said railing to allow said restraining assembly to move along said railing;
  (b) fixedly attaching a trolley boom to said restraining device;
  (c) slidably mounting a trolley on said trolley boom to provide a laterally moveable restraining force; and
  (d) attaching to said trolley a pivotable boom to allow said restraining force to follow lateral movement of said animal training along said path.

18. The method of claim 16, wherein the step of securing upon an animal to be trained a harness assembly further comprising the steps of:
  (a) providing a pivotable boom for connecting to said tether;
  (b) securing to said animal a harness; and
  (c) mounting a pivot assembly to operatively join said pivotable boom to said harness.

19. The method of claim 18, further including the steps of:
  (a) measuring the angular displacement of said pivotable boom to determine if said animal has moved laterally;
  (b) determining a new location of said trolley on said trolley boom necessary to return said restraining force directly behind said animal; and (c) relocating said trolley on said trolley boom to align said restraining force behind said animal.

20. The method of claim 16, further comprises the steps of:
(a) closing said elevated rail to provide a closed training path;
(b) mounting an additional restraining assembly upon said elevated rail to have plural restraining assemblies mounted on a single railing;
(c) securing an additional animal with an additional harness assembly;
(d) connecting said additional harness assembly to said additional restraining assembly and
(e) providing a control means for monitoring the location, speed, acceleration, and applied resistance of said restraining assembly, and adjusting the speed and direction of said restraining assembly, whereby plural animals may be trained simultaneously.

21. A sprint exercise training system for providing a restraining force on a moving animal comprising:
elevated railing defining a training path;
restraining assembly, slidably carried by said elevated railing for providing a restraining force along said training path; and
harness for conveying said restraining force to an animal moving along said training path;
said restraining assembly being located behind said animal opposite the direction of movement of the animal along said training path.

22. A sprint exercise training system for providing a restraining force on a moving animal comprising:
elevated railing defining a training path;
restraining assembly, slidably carried by said elevated railing for providing a restraining force along said training path; and
harness for conveying said restraining force to an animal moving along said training path, and attached to said restraining assembly;
whereby the animal is free to move laterally from the direction of said restraining force along said training path.

* * * * *